（12） United States Patent
Imaseki et al.

(10) Patent No.: US 9,563,828 B2
(45) Date of Patent: Feb. 7, 2017

(54) COLOR CONVERSION METHOD USING SCANNER, IMAGE READING SYSTEM, AND IMAGE FORMING APPARATUS

(71) Applicant: KONICA MINOLTA, INC., Chiyoda-ku, Tokyo (JP)

(72) Inventors: Rumi Imaseki, Hino (JP); Takeshi Yamaguchi, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/738,260

(22) Filed: Jun. 12, 2015

(65) Prior Publication Data

US 2015/0365564 A1    Dec. 17, 2015

(30) Foreign Application Priority Data

Jun. 13, 2014   (JP) .................................. 2014-122856

(51) Int. Cl.

| | | |
|---|---|---|
| G06K 15/02 | (2006.01) | |
| H04N 1/60 | (2006.01) | |
| H04N 1/00 | (2006.01) | |
| B41J 29/393 | (2006.01) | |

(52) U.S. Cl.
CPC .......... *G06K 15/1878* (2013.01); *B41J 29/393* (2013.01); *G06K 15/027* (2013.01); *H04N 1/00023* (2013.01); *H04N 1/00034* (2013.01); *H04N 1/00082* (2013.01); *H04N 1/6019* (2013.01); *H04N 1/6025* (2013.01); *H04N 1/6038* (2013.01)

(58) Field of Classification Search
CPC .............. H04N 1/6027; H04N 1/00023; H04N 1/00034; H04N 1/6019; G06K 15/07; G06K 15/1878
USPC .................... 358/1.9, 2.1, 504, 518; 382/167
See application file for complete search history.

(56) References Cited

U.S. PATENT DOCUMENTS

| | | | |
|---|---|---|---|
| 2004/0114164 A1* | 6/2004 | Linder ................. | H04N 1/6033 358/1.9 |
| 2005/0281459 A1* | 12/2005 | Bala .................... | H04N 1/6022 382/162 |

FOREIGN PATENT DOCUMENTS

JP        2010-193076 A       9/2010

* cited by examiner

*Primary Examiner* — Jamares Q Washington
(74) *Attorney, Agent, or Firm* — Buchanan Ingersoll & Rooney PC

(57) ABSTRACT

A color conversion method according to the present invention, in which a scanner that outputs a first color value of a device-dependent color space is used, includes the steps of: acquiring the first color value by reading, by the scanner, a printed material which is based on image data composed of C, M, Y, K values; converting the acquired first color value to a second color value using a scanner profile of the scanner; mapping the first color value acquired from the printed material to the K value of the image data of the printed material; determining a correction quantity of the second color value from the mapped first color value and the K value using a scanner profile correcting LUT; and correcting the converted second color value using the determined correction quantity of the second color value, and outputting the second color value after being corrected.

16 Claims, 10 Drawing Sheets

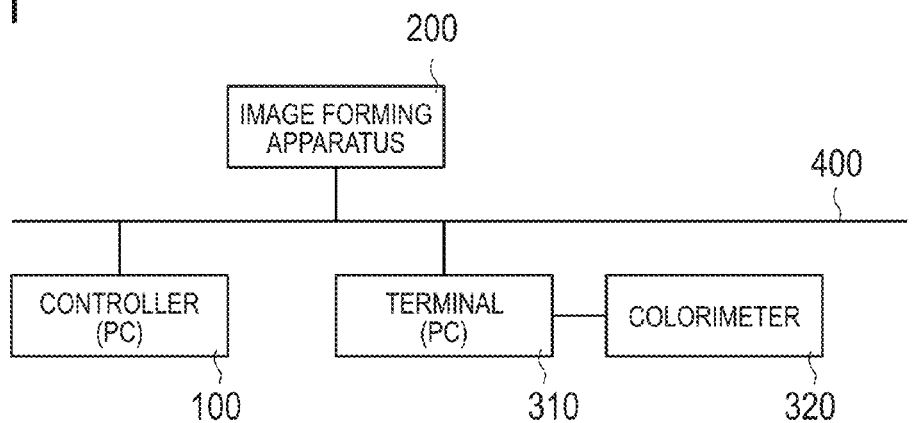
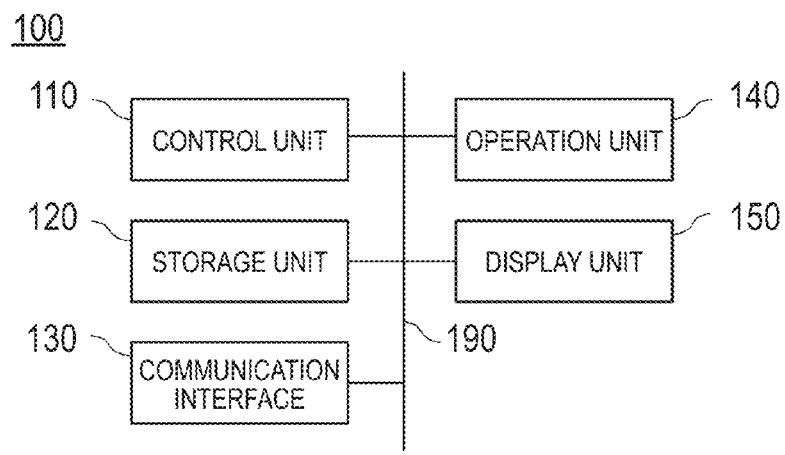
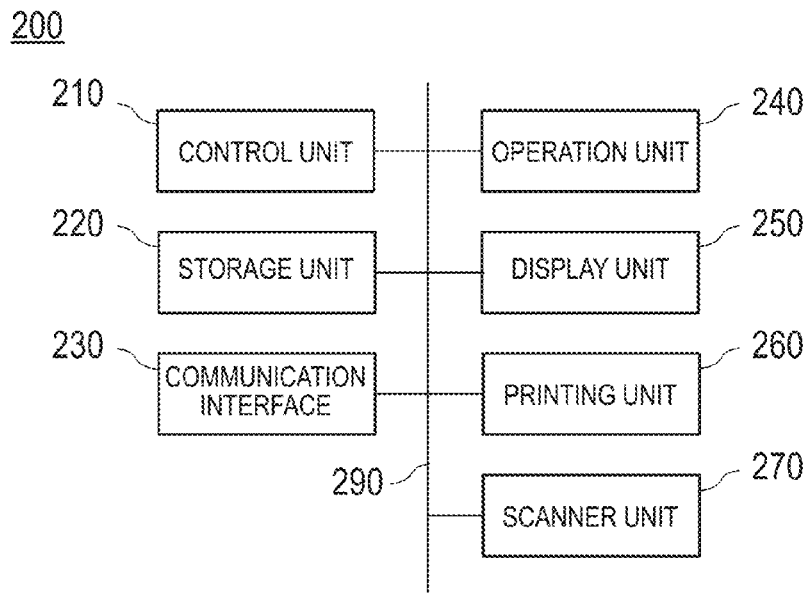

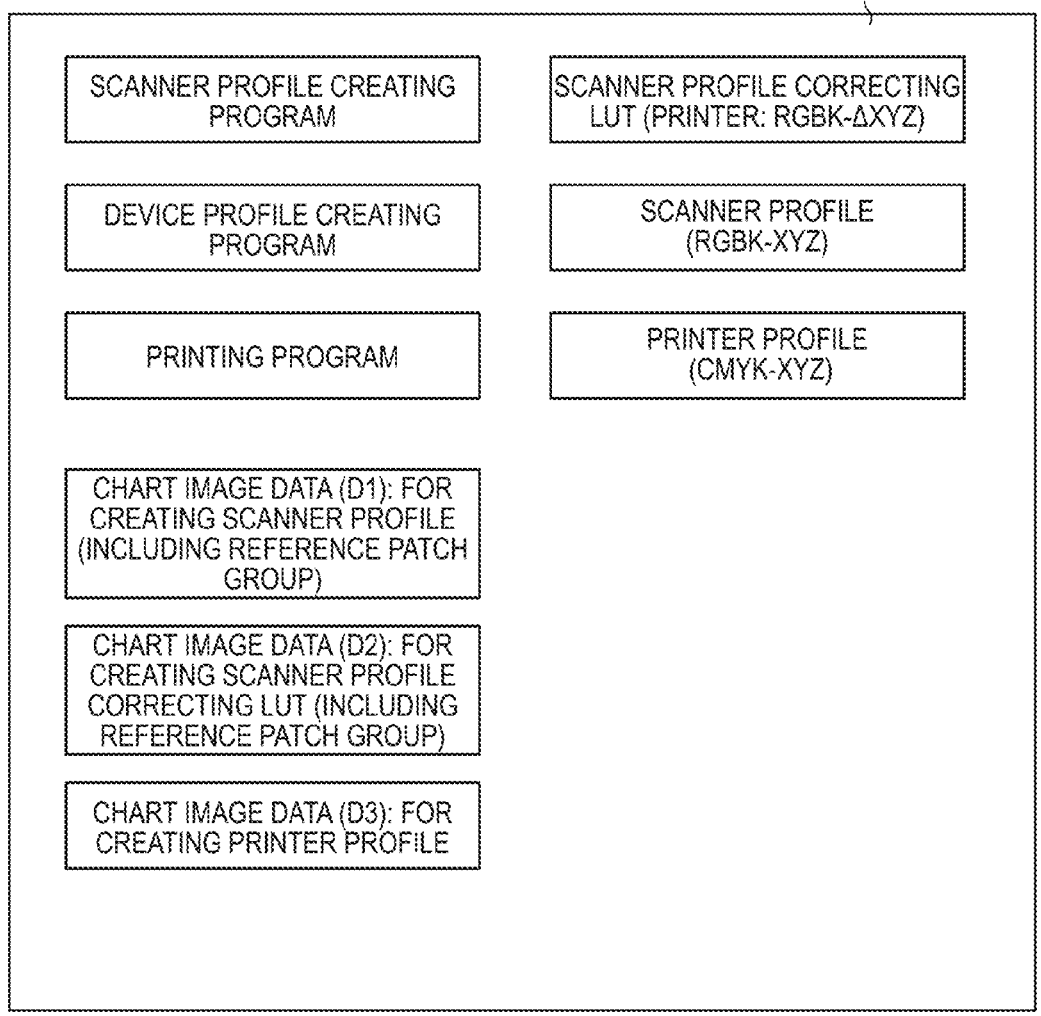

FIRST CHART IMAGE DATA (D1)
(FIRST PRINTED MATERIAL)

SECOND CHART IMAGE DATA (D2)
(SECOND PRINTED MATERIAL)

WAVELENGTH (nm)

WAVELENGTH (nm)

B=70
(CMYK1 (40, 35, 35, 0))

B=70
(CMYK2 (0, 0, 0, 50))
S1=S2

Z=25
CMYK1 (40, 35, 35, 0)

Z=28
CMYK2 (0, 0, 0, 50)
S3≠S4

COLOR CONVERSION METHOD USING SCANNER, IMAGE READING SYSTEM, AND IMAGE FORMING APPARATUS

CROSS-REFERENCE TO RELATED APPLICATION

This application is based on Japanese Patent Application No. 2014-122856 filed on Jun. 13, 2014, the contents of which are incorporated herein by reference.

BACKGROUND

1. Technical Field

The present invention relates to a method for acquiring a color value of a device-independent color space such as CIE XYZ using a scanner that outputs a color value of a device-dependent color space such as R, G, B.

2. Description of Related Arts

In recent years, there has been an increasing demand for color print in the field of production print. Further, highly precise color reproducibility is required of production print, and in most cases an enhanced color calibration is needed to meet the requirement. Meanwhile, it has been desired that the calibration be able to be conducted in a short time without the need for high-level knowledge.

As a method for conducting the calibration in a short time, it is conceivable to acquire a color value of a device-independent color space (standard color space) such as L*a*b* using a scanner provided in a printer, for example. In order to acquire the color value of the device-independent color space, it is necessary to prepare beforehand a look-up table (hereinafter referred to as "LUT") for converting RGB, which is outputted from the scanner which has performed the reading, to L*a*b*.

In order to acquire highly accurate L*a*b* using a scanner, it is necessary to optimize the LUT in conformity to the characteristic of the scanner since scanners are generally subjected to the device-to-device variation due to difference in characteristic among the entities. When optimizing the LUT, it was necessary to acquire a vast number of color data over the entire color space, and thus it was necessary to output patch images of many colors and to perform a color measurement of the patch images. As such, much labor and time was taken to optimize the LUT with respect to individual devices.

With regard to such problems, the image processing apparatus disclosed in Patent Document 1 (Japanese Unexamined Patent Application Publication No. 2010-193076 (particularly, paragraphs 0037 through 0038)) is configured such that in order to reduce the number of human hours when compensating for the device-to-device variation of two sensors for reading the front and back respectively, a correcting 3D LUT is formed of a small number of patches, without the first color conversion LUT being remade which is optimized with respect to each of the devices, and correction of the first color conversion LUT is indirectly performed using the correcting 3D LUT.

However, even if the correcting 3D LUT is created merely based on the color measurement value of patches as in Patent Document 1, a highly accurate color measurement result cannot necessarily be obtained.

In particular, Patent Document 1 does not recognize such a problem that when the same-color patches in a color chart are formed of different Amounts of K, the patches are read as the same RGB data at the scanner while the colorimetric values of the colorimeter are not necessarily the same. Nor does the document refer in any way to means for solving the problem.

The present invention has been made in view of the foregoing circumstances and has for an object to provide a method for making a highly accurate color measurement taking into account of the Amount of K when a high reading accuracy cannot be obtained at a scanner, while at the same time reducing the number of man hours taken to create a scanner profile.

SUMMARY

The foregoing object of the present invention can be achieved by means described below.

To achieve at least one of the abovementioned objects, a color conversion method in which a scanner that outputs a first color value of a device-dependent color space by reading a printed material is used to output a second color value of a device-independent color space, reflecting one aspect of the present invention comprises the steps of:

acquiring a first color value by reading, by the scanner, a printed material which is based on image data composed of C, M, Y, K values;

converting the acquired first color value to a second color value using a scanner profile of the scanner that with the first color value being an input, describes the second color value with respect to the input;

mapping the first color value acquired from the printed material to the K value of the image data of the printed material;

determining a correction quantity of the second color value from the mapped first color value and the K value using a scanner profile correcting LUT that with the first color value and the K value being an input, describes the correction quantity of the second color value with respect to the input; and correcting the converted second color value using the determined correction quantity of the second color value, and outputting the second color value after being corrected.

BRIEF DESCRIPTION OF THE DRAWINGS

FIG. 1 is a block diagram illustrating the configuration of a printing system;

FIG. 2 is a block diagram illustrating the configuration of a controller 100;

FIG. 3 is a block diagram illustrating the configuration of an image forming apparatus 200;

FIG. 4 is a schematic diagram for explaining data stored in a storage unit 120;

FIGS. 10A-10D are enlarged views in which FIGS. 8 and 9 are superposed;

DETAILED DESCRIPTION

Figure 5A:
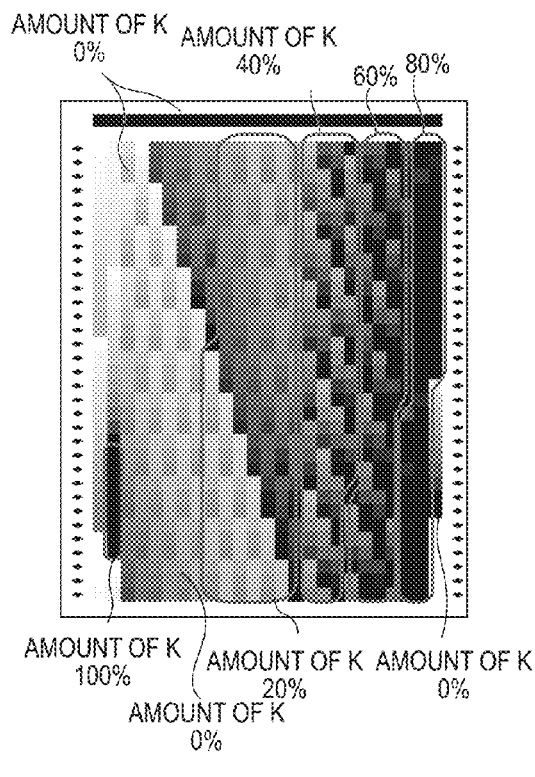
FIGS. 5A and 5B are imaginary views for explaining the contents of chart image data.

Embodiments of the present invention will now be described with reference to the accompanying drawings. Meanwhile, in the drawings and the specification of this application, like elements are denoted by like reference numerals, and an overlapping description is omitted. Further, in the drawings, for purposes of convenience of description, the size ratio is exaggerated, and may sometimes be different from the actual ratio.

FIGS. 1-3 are block diagrams illustrating the configuration of the printing system according to an embodiment of the present invention. As illustrated in FIG. 1, the printing system includes a controller 100, which may be comprised of a PC (personal computer) or the like, and an image forming apparatus 200, wherein the controller 100 and the image forming apparatus 200 are communicatively connected to each other via a network 400. Further, a terminal 310, which may be comprised of a PC or the like, is connected to the network 400, and a colorimeter 320 is locally connected to the terminal 310 such as based on the USB standard.

As illustrated in FIG. 2, the controller 100 includes: a control unit 110, which may include a CPU, RAM or the like; a storage unit 120, which may be comprised of a semiconductor memory (ROM, SSD, or the like) or a hard disc (HDD); a communication interface 130 that communicates with a variety of terminals, which may be connected to the network 400; an operation unit 140, which may be comprised of a mouse, keyboard, or a touch sensor superposed on a touch panel or the like; and a display unit 150, which may be comprised of a liquid crystal display. These units are connected to each other via a signal line 190 such as a bus.

As shown in FIG. 3, the image forming apparatus 200 includes a control unit 210, a storage unit 220, a communication interface 230, an operation unit 240, a display unit 250, a printing unit 260, a scanner unit 270, and a signal line 290. The configuration, except for the printing unit 260 and the scanner unit 270, is similar to that of the controller 100, and a description thereof will be omitted.

The printing unit 260 includes a developing unit, which contains color toners or color inks of four colors, i.e., C, M, Y, and K, and is configured to form a full-color image on a sheet in accordance with color signals of CMYK.

[Scanner Unit 270]

The scanner unit 270 performs a color measurement by irradiating uniform light from a light source (lamp) to a manuscript and focusing the reflected light on a line-like sensor through a light receiving lens. The sensor, which may be comprised of CCD, CMOS or the like, is covered with three types of (R, G, B) filters, and outputs color values of R, G, B corresponding to the filter types. The R, G, B color values are color values (first color value) of a device-dependent color space that depends on the characteristics of the scanner unit 270 unlike a color value of a device-independent color space, which is acquired from the colorimeter 320.

The scanner unit 270 is located in a sheet conveyance path downstream of the printing unit 260, and is capable of reading a sheet being conveyed on which an image has been formed by the printing unit 260. The control unit 210 knows of the position information of a patch image or other images formed on the sheet by analyzing print data for use as an original for forming the image at the printing unit 260. Based on the acquired position information of the patch image, it is possible to achieve a mapping between the R, G, B color values acquired by reading the image of each patch and the K value for the image data of the pertinent patch.

[Colorimeter 320]

The colorimeter 320 shown in FIG. 1, which is also referred to as spectrophotometer, measures reflected light from a surface of an object to be measured and thus acquires a spectral distribution of the surface within the visible light range or within the near infrared to near ultraviolet wavelength range. It also outputs a color value (coloration value) of a device-independent color space as an output other than the spectral distribution. For the color value (second color value) of the device-independent color space, there are CIE XYZ and CIE Lab (hereinafter described as L*a*b*).

Among specific examples of the colorimeter are FD-7 (manufactured by KONICA MINOLTA, Inc.) and i1iSis (manufactured by X-Rite, Inc.), which allow for acquisition of spectral data within the wavelength range from 380 nm to 730 nm or the color values for CIE XYZ and L*a*b* under the D50 light source or various other standard light sources.

Further, the terminal 310 has stored therein a control program that operates when a color measurement is conducted at the colorimeter 320. Color charts (chart including a plurality of patch groups) such as image data printed on a printed material, e.g., chart image data D1 for creating a scanner profile (hereinafter described with reference to FIGS. 4 and 5A) are registered in the control program as well. Mapping of each patch to its colorimetric value can be achieved by the user, by conducting a color measurement for each patch image in accordance with the procedure specified by the control program. Further, if the colorimeter 320 is equipped with a sheet feed mechanism that conveys a sheet-like printed material to the colorimeter 320, it may be configured such that the control program automatically performs mapping of each patch to its colorimetric value in accordance with the procedure mentioned below. First, the image on the entire surface of the printed material is read automatically while conveying the printed material by the sheet feed mechanism (color measurement). Subsequently, register marks are located at predetermined positions such as the four corners or both sides of the printed material so that the position information of each patch image is obtained based on the relative positions between the register marks and the respective patches through image recognition of the register marks and the respective patch images. Finally, mapping of each patch to its colorimetric value is performed based on the position information.

FIG. 4 is a schematic diagram for explaining data stored in the storage unit 120 of the controller 100. In the storage unit 120 are stored, as programs, a program for creating a scanner profile, a program for creating a device profile for a printer or other devices, and a printing program. These programs are developed to the RAM of the control unit 110 or the like, and executed through cooperation with the CPU. The printing program has the functions of converting a document file created using a word processor software or the like, an image file such as TIF or EPS (Encapsulated Post Script) form, or a PDF form file to print data in a Page Description Language (PDL) such as PS, PCL or the like, and transmitting the print data to the image forming apparatus together with the print setting selected by the user. The contents of the programs other than the printing program will be described based on a control flow chart hereinafter.

Further, the following data are stored as image data: (1) chart image data D1 for creating a scanner profile; (2) chart image data D2 for creating a scanner profile correcting LUT; and (3) chart image data D3 for creating a device profile, or the like. Meanwhile, the chart image data is image data composed of CMYK color signals.

Figure 5B:
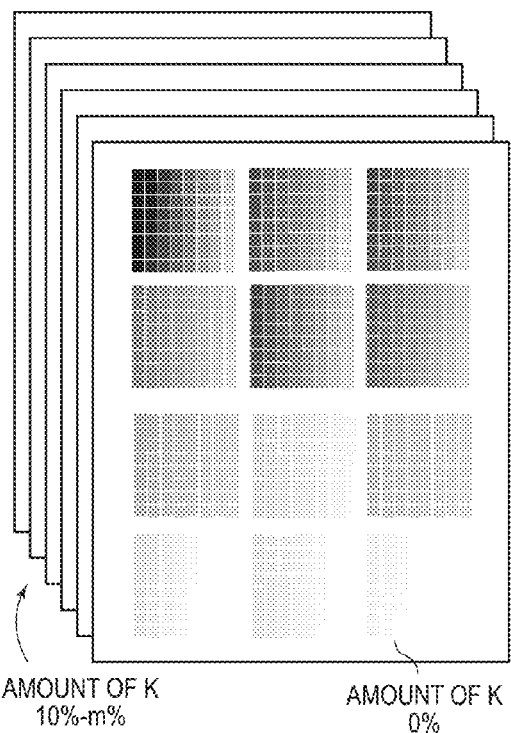

FIGS. 5A and 5B are imaginary views for explaining the contents of the chart image data. FIGS. 5A and 5B respectively illustrates the chart image data D1 for creating a scanner profile (hereinafter referred to simply as "chart image data D1") and the chart image data D2 for creating a scanner profile correcting LUT (hereinafter referred to simply as "chart image data D2"), in both of which are arranged a plurality of patches that are differentiated in color and density from each other.

The chart image data D1 is composed of image data for a single page, as shown in FIG. 5A, which is comprised of a plurality of patches which are composed of combinations of K values for which Amounts of K are 0, 20, 40, 60, 80, and 100% in the single page and C, M, Y values in the range of 0-100%, and differentiated in color and density from each other.

The chart image data D2 is composed of image data for plural pages in which Amounts of K are differentiated from each other in a plurality of steps, as shown in FIG. 5B. The chart image data D1 and D2 both include a reference patch group. Further, most of the patches included in the chart image data D1 are included in the chart image data D2.

In the chart image data D1, for example, one patch is provided in which each of the C, M, Y values is 50% for the K value of 50%. In a first example of the chart image data D2, as the corresponding patch, each of the C, M, Y values is rated in six steps such as 0, 20, 40, 60, and 100%, besides 50%, for the K value of 50%, so that 216 patches are provided which result from a combination of these values.

As such, the chart image data D2 includes a number of patches. Further, these patches include a reference patch included in a reference patch group and a plurality of other patches which are set so as to reproduce the color of the reference patch with a plurality of other different K values.

For example, patches serving as reference patches are arranged in which a particular color is converted to three colors, i.e., C, M, Y with the K value of 0%. In this case, the plurality of other patches which reproduce the same color include (1) a patch in which the gray component of the particular color is completely substituted with the K value (for example, the K value of 30%) and the remainder is represented by a component comprising two colors (or one color) of C, M, Y, and (2) one or more patches which are reproduced based on a combination of the K value (for example, K value of 10 or 20%) intermediate between the maximum K value in (1) and zero value with C, M, Y.

Meanwhile, the term "same color" as used herein refers to a color that is not completely the same even in terms of spectral sensitivity characteristics but is isochromatic under a particular condition. Specifically, colors for which the outputs of the R, G, B sensors of the scanner unit 270 represent the same values even if the spectral sensitivity characteristics are different (as in FIG. 10 described hereinafter), are the same colors. Further, it is possible that colors for which instead of the output values of the RGB sensors, outputs for tristimulus X, Y, Z color values represent the same values, may be treated as the same colors.

Further, in a second example of the chart image data D2, it may be composed of patches in which each of the C, M, Y values is rated in six steps of 0, 10, 20, 40, 70, and 100%, and for all the combinations (216 kinds (=3rd power of 6)), K values, which are rated in 11 steps with a step size of 10% in the range from 0 to 100%, are combined. In this case, the total number of the patches in the chart image data D2 becomes 2376 (=216×11). Then, reference patch groups are included in the 2376 patches, so that all the reference patch groups are included in the chart image data D1. In this case, even though no other patch that is the same color as the patches of the reference patch group is found, a combination of C, M, Y, K values, which presents the same color, can be determined by interpolation from the colors of 2376 lattice points.

Thus, in the first example, since it includes the reference patch groups of the chart image data D2 and a plurality of other patches in which the color of the reference patch is reproduced with other Amounts of K, the total number of the patches is very large. This likewise applies in the second example. In contrast, the number of the patches in the chart image data D1 is not so large since about ten-odd other patches are added to the reference patch group. More specifically, the number of the patches included in the chart image data D1 is very small, as small as from one-severalth to one-several tenths, as compared with that of the chart image data D2

Further, the storage unit 120 has stored therein the scanner profile correcting LUT, the scanner profile, and the device profile. The "scanner profile correcting LUT" is that in which correction quantities of ΔX, ΔY, ΔZ are described with respect to inputs R, G, B, and K. The "scanner profile" is that in which the characteristic of the scanner unit 270 is described, e.g., a LUT (look-up table) that converts an input signal of R, G, B to an output signal of CIE XYZ. The device profile is a LUT that converts an input signal of c, M, Y, K to an output signal of L*a*b* or a LUT that performs its inverse conversion. Description will next be made of a color conversion method in which the scanner profile and the scanner profile correcting LUT are used. Meanwhile, methods for creating the scanner profile correcting LUT and the device profile will be described herein later.

<Color Conversion Method Using Scanner Profile Correcting LUT>

Figure 6:
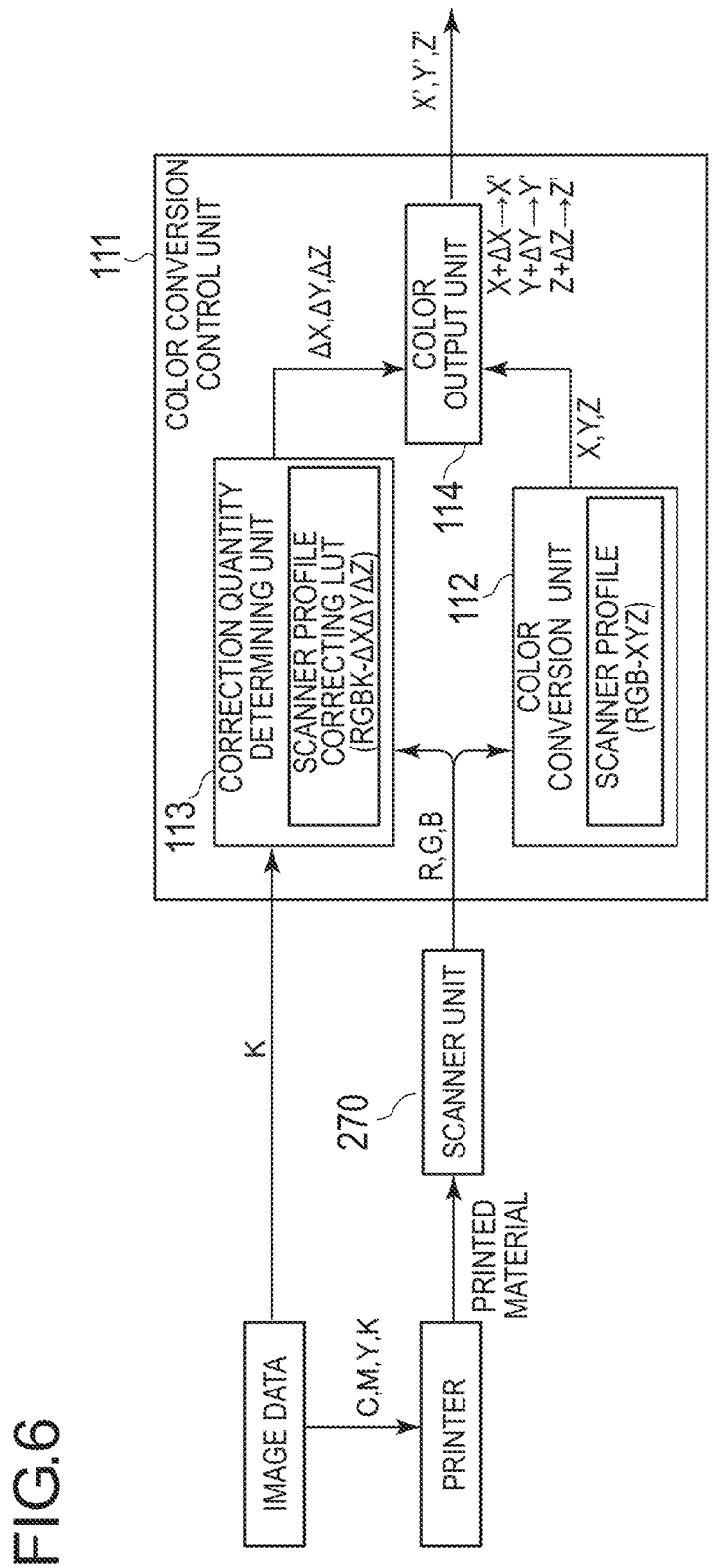
FIG. 6 is a control block diagram for explaining a color conversion method.
Figure 7:
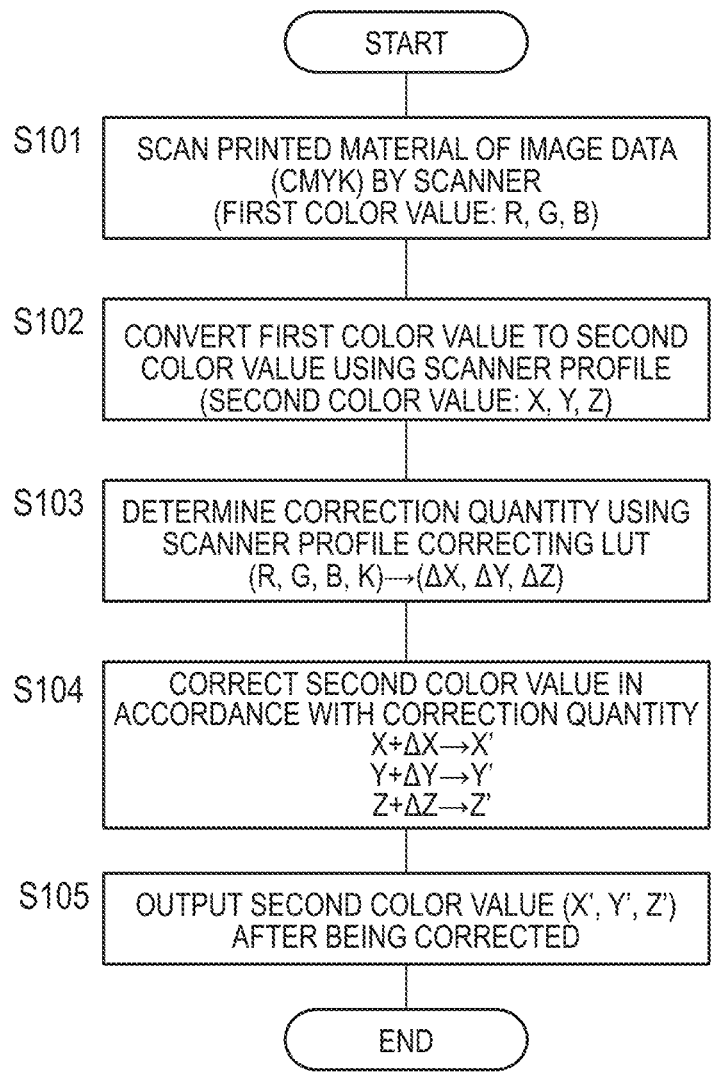
FIG. 7 is a control flowchart illustrating a color conversion method.

FIG. 6 is a control block diagram for explaining a method for a color conversion by a color conversion control unit 111, which is realized mainly by the control unit 110 of the controller 100, and FIG. 7 is a control flow chart.

First, a printed material, which is printed based on image data composed of C, M, Y, K values, is read by the scanner unit 270 so that a color value of RGB (first color value) is acquired, and the thus acquired RGB is in turn inputted to the color conversion control unit 111 (S101 in FIG. 7)

The color value of RGB as inputted is converted to a color value of CIE XYZ at the color conversion unit 112 using the scanner profile (RGB-XYZ) read out of the storage unit 120 (S102).

Meanwhile, the correction quantities (ΔX, ΔY, ΔZ) are determined by the correction quantity determining unit 113 using the scanner profile correcting LUT, based on the color value of RGB inputted from the scanner unit 270 and the K value of the image data stored in the storage unit 120 (S103).

The color value (XYZ) converted at the step S102 is corrected based on the correction quantity determined at the step S103 (S104). For example, if the scanner profile correcting LUT outputs ΔXYZ=0, 0, −3 for inputs RGBK=70, 70, 70, 50, the color values XYZ=25, 25, 28 converted at the step S102 are corrected to X'Y'Z'=25, 25, 25 at the step S104. Then, the color output unit 114 outputs the corrected color values (X', Y', Z'), and the procedure is ended (S105).

<Merit of Using Amount of K>

Here, the reason for using the K value is described. In the conventional technique, it has been the practice to convert the RGB color value read by the scanner to a color value of a device-independent color space such as CIE XYZ or L*a*b* value, using a 3-dimensional LUT. However, it is difficult to convert RGB to XYZ at a high accuracy, and under a particular condition, it may sometimes be not possible to make a conversion on one-to-one basis. For example, two gray color patch images CMYK1 (CMYK=40, 35, 35, 0) and CMYK2 (CMYK=0, 0, 0, 50) are formed on a sheet, which are composed of three-color toners other than K and only of K color toner, respectively. Further, when the images are color-measured by the scanner unit 270 and colorimeter 320 respectively, the color values acquired by the scanner unit 270 both represent RGB=70, 70, 70, while the color values acquired by the colorimeter 320 represent different values such as XYZ=25, 25, 25 for the image of CMYK1 and XYZ=25, 25, 28 for the image of CMYK2. The reason for this will be described with reference to the drawings.

Figure 8:
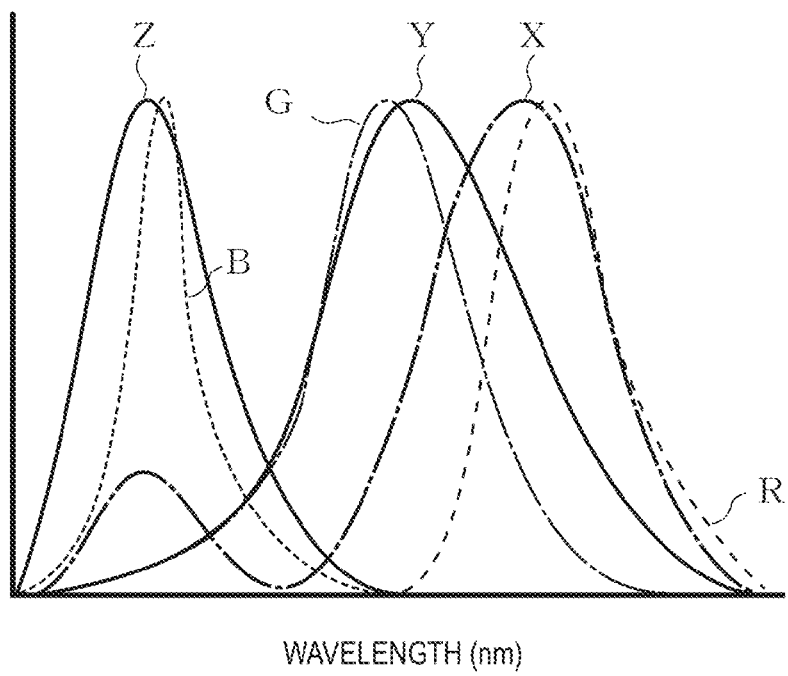
FIG. 8 is a view illustrating spectral sensitivity characteristics with respect to wavelength

FIG. 8 is a view illustrating the spectral sensitivity characteristic of each of the R, G, B sensors of the scanner unit 270 and the color matching functions (the ratios of which are adjusted such that the vertical axis lengths are equal to each other), which are X, Y, Z filters, with the horizontal axis indicating wavelength (nm) and the vertical axis indicating the relative spectral sensitivity characteristic. As shown in FIG. 8, the waveforms do not coincide between the color matching functions, which are X, Y, Z filters, and the R, G, B sensors.

Figure 9:
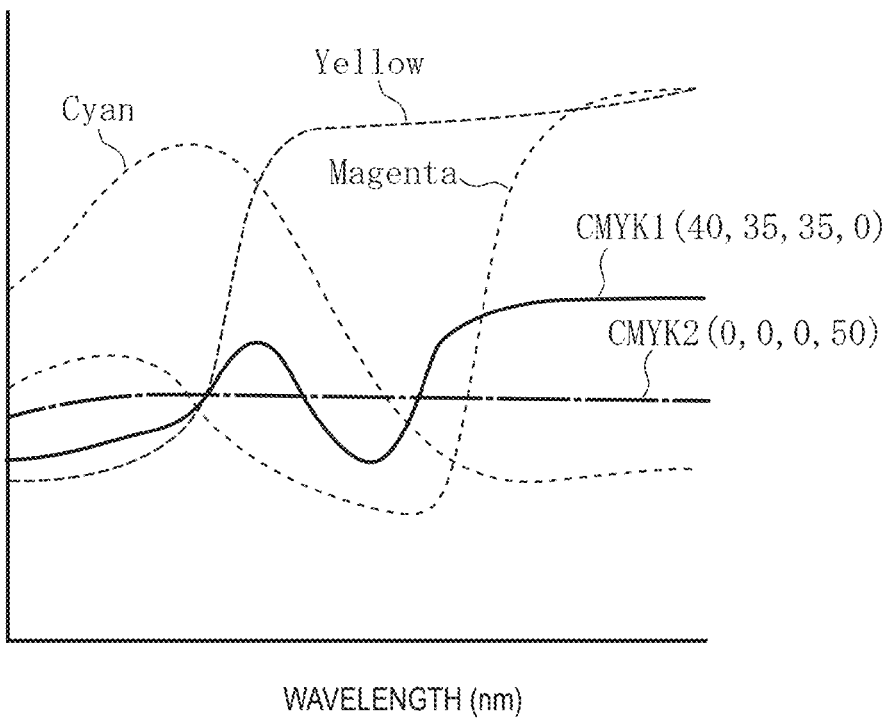
FIG. 9 is a view illustrating spectral reflectance factors with respect to wavelength.

FIG. 9 is a view illustrating the spectral reflectance factor, with horizontal axis indicating wavelength (nm) and the vertical axis indicating reflectance factor. In FIG. 9, two spectral distributions are illustrated for the patch image CMYK1 and the patch image CMYK2, respectively. The bracketed numerals in FIG. 9 represent, from left in order, the signal values for the C, M, Y, K image data; in CMYK1, the gray color is produced from three color materials of CMY except for K, and in CMYK2, the gray color is produced from a color material of K alone. Additionally, spectral distributions for the respective color materials of Cyan, Magenta, and Yellow are illustrated together for reference.

It can be understood from FIG. 9 that the waveforms of CMYK2, which are spectral distributions of the patch images formed from the color material of the K alone, are relatively flat, whereas the waveforms of CMYK1 corresponding to the patch images formed from three color materials of C, M, Y present concavo-convex shapes in correspondence to the wavelength distributions of the respective color materials.

Figure 10A:
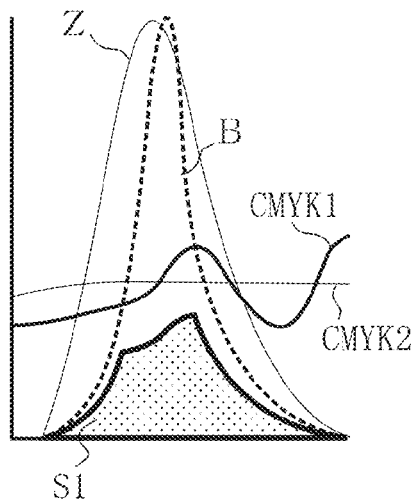
Figure 10B:
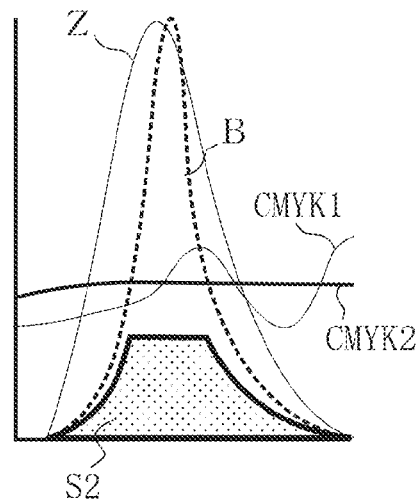
Figure 10C:
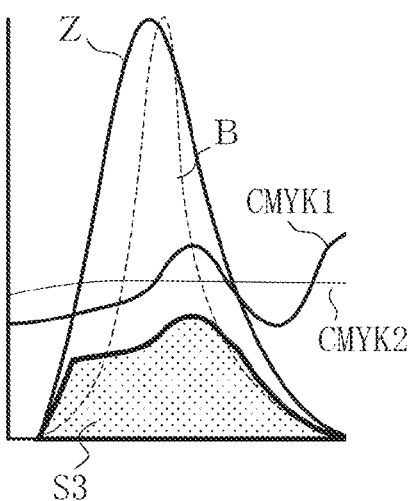
Figure 10D:
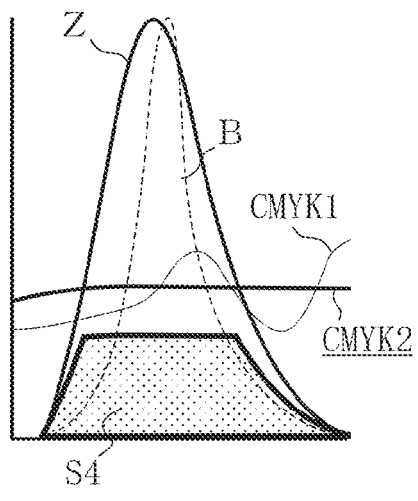

FIGS. 10A-10D are views in which the waveforms of FIGS. 8 and 9 are superimposed upon each other, and only the portions related to the B sensor of the scanner unit 270 and the color-matching function of the Z-filter are extracted. More specifically, FIG. 10A is a view for explaining the output of the B color value for CMYK1, which is calculated through the B sensor of the scanner unit 270; FIG. 10B is a view for explaining the output of the B color value for CMYK2, which is calculated through the B sensor of the scanner unit 270; FIG. 10C is a view for explaining the output of the color value of tristimulus value Z for CMYK1, which is calculated from the color matching function of the Z-filter; and FIG. 10D is a view for explaining the output of the color value of the tristimulus value Z for CMYK2, which is calculated from the color matching function of the Z-filter.

In FIGS. 10A and 10B, the hatched areas S1 and S2 represent the B color values that are calculated through the B sensor of the scanner unit 270. The areas can be determined by multiplying the spectral distribution for each wavelength with the sensitivity characteristic of the B sensor and integrating the multiplication. In FIGS. 10A and 10B, since area S1=area S2, the B color values both represent 70, i.e., are equal to each other.

Likewise in FIGS. 10C and 10D, the hatched areas S3 and S4 represent the spectral distribution for each wavelength multiplied by the sensitivity characteristic of Z tristimulus value. In FIGS. 10C and 10D, since S3≠S4, the Z color value is different between the two cases, that is, the Z color value is 25 in FIG. 10C, and 28 in FIG. 10D.

Since, as in FIG. 9, the spectral distributions do not coincide between the patch images having different Amounts of K such as between CMYK1 (CMYK=40, 35, 35, 0) and CMYK2 (CMYK=0, 0, 0, 50), it may sometimes happen that the CIE XYZ color values from the colorimeter 320 are different from each other even if the RGB color values from the scanner unit 270 are the same.

Then, in the present embodiment, a scanner profile correcting LUT is used to which is inputted RGBK resulting from addition of the K value signal of the image data to the RGB color values acquired from the scanner unit 270, and which describes a relationship between the input and the quantity of correction to the color value of the device-independent color space. By making the correction using the scanner profile correcting LUT for compensating for the device-to-device variation, it becomes possible to calculate the color value of the device-independent color space from the RGBK signals at a high accuracy.

In the present embodiment, the color value of the device-dependent color space is compensated for using an indirect scanner profile correcting LUT instead of using a direct scanner profile LUT for compensating for the device-to-device variation, for the reason mentioned below. More lattice point data are required when creating a 4-dimensional LUT such as RGBK-XYZ, in which the K value is added, than when creating a 3-dimensional LUT such as RGB-XYZ. For example, when creating patches with six kinds for each signal, the number of the patches to be created is increased by six times, such as from $6^3$ to $6^4$. Thus, in order to create a 4-dimensional LUT, it is necessary to create a vast number of patches as with the chart image data D2, and prepare color measurement data thereof. Due to this, a number of man hours are required, and a quantity of resources (toner, paper sheet) is consumed.

Therefore, in the present embodiment, the scanner profile for compensating for the device-to-device variation is in the form of a 3-dimensional LUT in which RGB and XYZ constitute input and output factors, respectively. In this manner, the number of the necessary patches can be reduced as compared with creating a 4-dimensional LUT. Meanwhile, a highly precise color measurement becomes possible by using a scanner profile correcting LUT in the form of a 4-dimensional LUT together. This scanner profile correcting LUT is created beforehand and stored in the storage unit 120 as described hereinbelow.

The creation of the scanner profile correcting LUT may be made by a person in charge of development, a person in charge of manufacture, or other person in charge, in a production line or immediately before the start of production, for example. In this case, a printed material which has the chart image data D2 printed on a standard sheet is used. Further, as the scanner unit 270 for this case, a device is selected which has been proven to exhibit an average characteristic in the presumed range of the device-to-device variation.

Such a scanner profile correcting LUT created by the person in charge can be commonly used not only for the scanner unit 270 as used but also for other scanner unit 270. Preferably, the scanner profile correcting LUT created by the person in charge is stored beforehand in the storage unit 220 of the image forming apparatus 200 at the time of shipping or distributed via the network 400 and stored beforehand in the storage unit 120. This eliminates the need to create the scanner profile correcting LUT at the individual scanner unit 270.

Meanwhile, the creation of the scanner profile is performed at the market, for example, by the user himself/herself in order to compensate for a device-to-device variation and/or a variation in the scanner reading value due to the media characteristic of the printed material. As the scanner unit 270, the one which is actually used is used at this time. Further, a printed material, which has the chart image data D1 printed on a sheet which is to be actually used by the user, is used. Particularly when using a special sheet such as a coated sheet such as a glossy sheet or the like or a colored sheet, the variation in the scanner reading value is so large that it is preferable to create/update the scanner profile in conformity to the media.

Hereinbelow, description will be made of a method for creating a scanner profile correcting LUT which is created by a person in charge taking into account of the K value.

<Method for Creating a Scanner Profile Correcting LUT>

The method for creating a scanner profile correcting LUT will be described with reference to FIGS. 11 and 12.

First, the control unit 110 causes the scanner unit 270 to read a printed material (hereinafter referred to as "second printed material") obtained by printing the chart image data D2 for creating the scanner profile correcting LUT onto a plurality of sheets. In this manner, a first color value (RGB) is acquired (S201).

The user performs a color measurement of the same second printed material by the colorimeter 320. The control unit 110 acquires, via the terminal 310, the second color value (CIE XYZ), which is a result of the color measurement (S202).

With regard to each patch image formed on the second printed material, the first and second color values and the K value are mapped to each patch by referring to the chart image data D2. Then, the mapped color measurement data group is stored in the storage unit 120 (S203).

What has been described above is the preparatory stage. Referring to FIG. 12, description will now be made of the method for creating a 4-dimensional scanner profile correcting LUT in which the stored color measurement data group is used to make an input of the RGB and K values and an output of the CIE XYZ.

Figure 12:
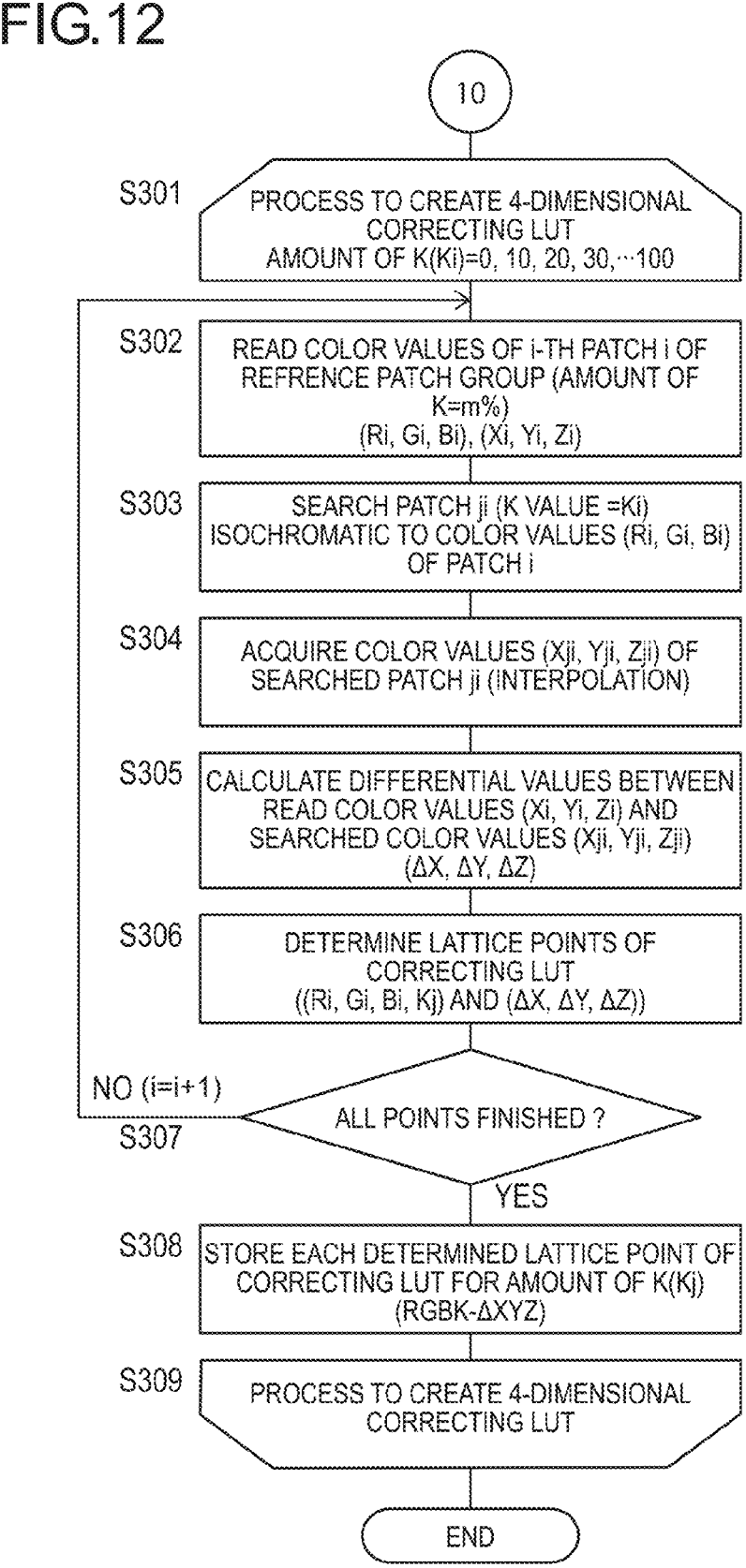
FIG. 12 is a control flow chart illustrating a method for creating a scanner profile correcting LUT.

Steps S301 through 309 constitute a loop process, and in the example illustrated in FIG. 12, the Amount of K is set up in 11 steps in total from the initial value of 0% to 100% with a step size of 10%, and the correction value with respect to each Amount of K is determined. Meanwhile, the Amount of K set up here corresponds to the Amount of K of either one of the patches contained in the chart image data D2.

Figure 11:
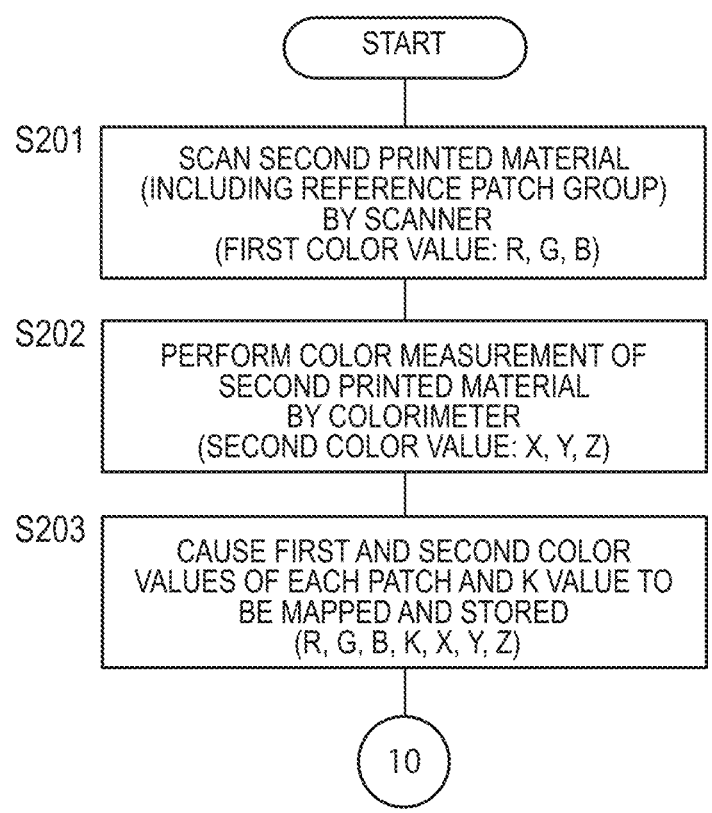
FIG. 11 is a control flow chart illustrating a method for creating a scanner profile correcting LUT.

The control unit 110 sets up the Amount of K of 0% as the initial value at S301, and then reads, at the step S203, the first and second color values of the i-th patch i (initial value=1) in the reference patch group from the color measurement data group stored in the storage unit 120 at the step S203 of FIG. 11 (S302).

The reference patch group refers herein to the patch group included in the chart image data D2, i.e., a set of patches in common to the chart image data D1. Each patch is a patch that serves as a reference when the correction quantity is calculated as shown below. Although the Amount of K of each patch in the reference patch group is predetermined, description will be made hereinbelow on the assumption that the Amount of K of every patch serving as a reference in the reference patch group is m % that is constant, and this m % is zero, for the sake of ease of description.

While it is not necessarily necessary that the reference patch group is included in the chart image data D1 for creating the scanner profile, it is preferable to use common patches and make a correction with the common patches as lattice points, from the point of view that the accuracy of correction can be effectively enhanced despite the less number of lattice points.

Subsequently, at the step S303, a patch ji is searched which is isochromatic to the color values (Ri, Gi, Bi) of the reference patch i read at the step S302. The Amount of K (K value) of the patch ji is Kj (for example, 50%) set up at the step S301. If the color value of the patch i is such that RGB=70, 70, 70, for example, then a patch having the same color value as the patch for which the Amount of K is Kj is searched from among the color measurement data group stored at the step S203.

With the patch acquired by the search being the patch ji, the color values $(X_{ji}, Y_{ji}, Z_{ji})$ of the patch ji are acquired from the color measurement data group (S303). Meanwhile, if no patch being isochromatic (RGB) is present at the step S302, it is possible that a plurality of patches that represent a color value in the vicinity of the color value of the patch i may be selected from the patches for which the Amount of K is Kj, and that the color values $(X_{ji}, Y_{ji}, Z_{ji})$ may be calculated from those patches by performing the interpolation processing.

Subsequently, the differential values $(X_i-X_j, Y_i-Y_{ji}, Z_i-Z_{ji})$ of the color values $(X_i, Y_i, Z_i)$ of the reference patches read out at the step S302 with respect to the color values $(X_{ji}, Y_{ji}, Z_{ji})$ acquired at the step S304 are calculated (S305) and let to be the correction quantities $(\Delta X_i, \Delta Y_i, \Delta Z_i)$ (S306). For example, assuming that the color values of the patch i for RGBi=70, 70, 70 are such that XYZi=25, 25, 25 and that the color values of the patch ji, which is isochromatic (RGB) to the patch i, with Kj=50, are such that XYZji=25, 25, 28, the differential values are such that $\Delta XYZ$=0, 0, −3. Consequently, the LUT for correction is determined as follows:

TABLE 1

| (Ri, Gi, Bi, Kj) | ($\Delta X, \Delta Y, \Delta Z$) |
|---|---|
| 70, 70, 70, 50 | 0, 0, −3 |

The processing of the steps S302 through S306 is repeated for all the patches i of the reference patch group. When the processing is finished for all the patches of the reference patch group (step S307: YES), the determined correction LUT is stored (S308); this is repetitively performed for other Amounts of K, and the procedure is ended (S301-S309).

In this manner, the scanner profile correcting LUT is created that describes the correction quantities of the second color value (CIE XYZ) with respect to the first color value (RGB) acquired by reading by the scanner unit 270 and the K value.

Although in the foregoing description, it has been assumed that the Amount of K for all the patches in the reference patch group is m % that is constant, and this m % is zero, for the sake of ease of description, it is also possible, without being limited thereto, that the Amount of K m % for the patches of the reference patch group may be set to values other than zero, and that the color value consisting of the difference between this Amount of K and the Amount of K (Kj) set up at the step S301 may be made to be a correction quantity. In this case, the value Kj in Table 1 is substituted with the value of Kj−m, and m is subtracted from the input K value (for example, the K value inputted to the correction quantity determining unit 113) as well.

<Method for Creating the Scanner Profile>

Figure 13:
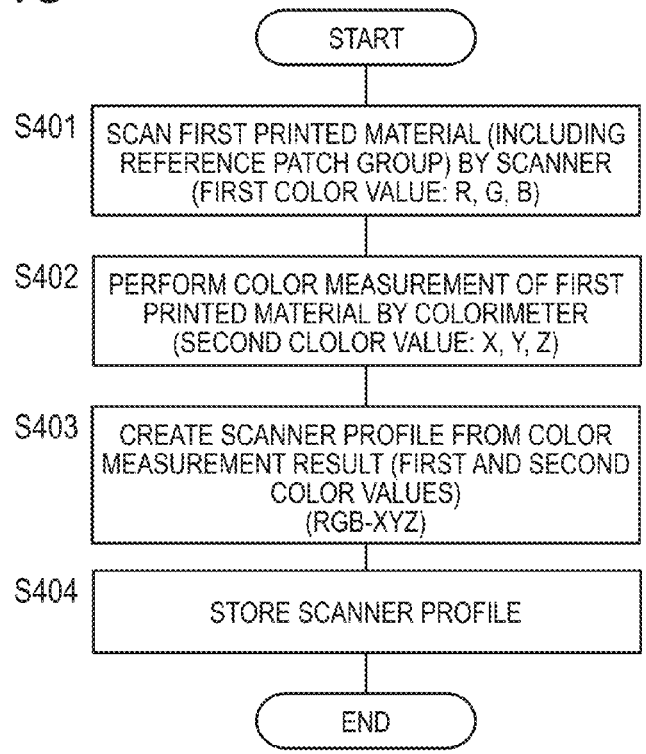
FIG. 13 is a control flow chart illustrating a method for creating a scanner profile.

FIG. 13 is a control flow chart for explaining the method for creasing the scanner profile. This control flow is executed by the printing system using a program for creating the scanner profile, which is stored in the storage unit 120. Further, as the scanner unit 270, the one that is actually used is used, as described above, and a printed material (hereinafter referred to as "first printed material") which is printed with the chart image data D1 (see FIG. 5A) is used. It is also possible that the first printed material may be created using a special sheet which is practically used, instead of a standard sheet, as occasion demands.

First, the control unit 110 causes the scanner unit 270 to read the first printed material so as to acquire the first color value (RGB) (S401).

The user makes a color measurement of the first printed material by the colorimeter 320. The control unit 110 acquires the second color value (CIE XYZ), which is a result of the color measurement, via the terminal 310 (S402 (a color value acquiring unit)).

The control unit 110 creates a scanner profile, which is a 3-dimensional LUT that with the first color value (RGB) from the result of the color measurement being an input, describes the output of the second color value (CIE XYZ) with respect to the input (S403 (a scanner profile creating unit)), and stores the scanner profile in the storage unit 120 (S404).

Using the scanner profile correcting LUT created in FIGS. 11 and 12 and the scanner profile created in FIG. 13, it becomes possible to acquire the color value of the device-independent color space at a high accuracy by performing a color measurement using the scanner by the color conversion method illustrated in FIGS. 6 and 7. In other words, in the present embodiment, in case a highly accurate reading cannot be achieved by the scanner, it is possible to provide a highly accurate color conversion method in which the Amount of K is taken into account, by making correction using the scanner profile correcting LUT in which the Amount of K is made to be an input factor.

Further, because of the fact that the scanner profile is a 3-dimensional correction table that with the first color value (RGB) being an input, describes the second color value (CIE XYZ) with respect to the input, the number of patches required to create the profile is less as compared with a 4-dimensional correction table in which the K value is taken into account. In contrast, when a 4-dimensional conversion table is created which with the K value and the first color value being an input, describes the second color value with respect to the input or when a 4-dimensional correction table is created which with the K value and the first color value being an input, describes the correction quantity of the second color value with respect to the input as shown in FIG. 12, color measurement data for a very large number of patches is needed.

In the present embodiment, a 4-dimensional scanner profile correcting LUT (RGBK-ΔXYZ) which requires a large number of patches and color measurement data thereof is created beforehand, and is used commonly for a plurality of devices. By so doing, it is possible to omit the creation of a very large number of patches and a 4-dimensional LUT associated with the color measurement at individual devices. Thus, it is possible to reduce the number of man hours and resources required for creation of a vast number of patches and the color measurement. Further, with regard to compensation for a change associated with the device-to-device variation and the media change, it suffices to create a 3-dimensional scanner profile (RGB-XYZ), in which the Amount of K is not made to be a factor, depending on the characteristics of the individual devices and media, and therefore, a less number of patches than that required to create a 4-dimensional scanner profile in which the K value is taken into account is sufficient. In this manner, it becomes possible to reduce, as a whole, the number of man hours and resources required to create a profile for performing a highly accurate color measurement.

<Method for Creating a Printer Profile>

Figure 14:
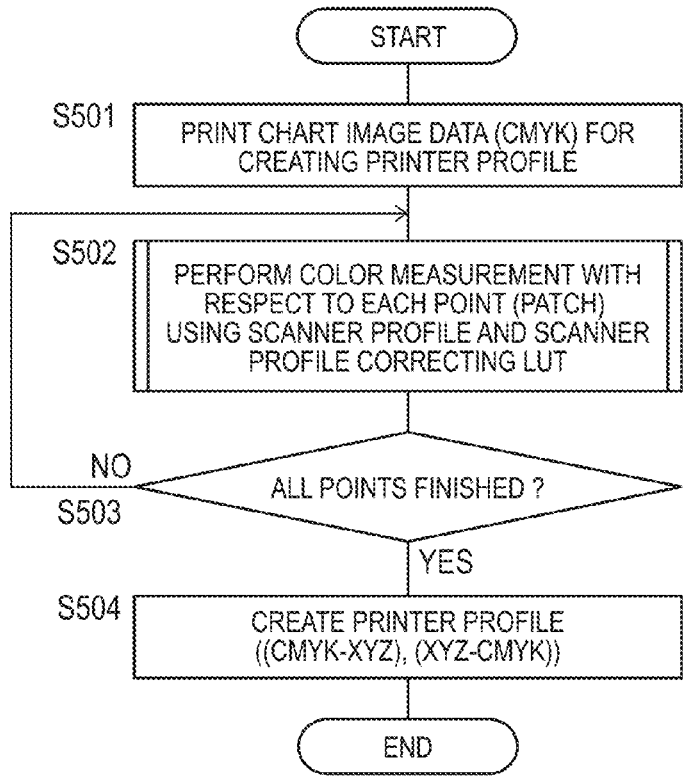
FIG. 14 is a control flow chart illustrating a method for creating a printer profile.

Referring next to FIG. 14, a method for creating a printer profile will be described which uses the scanner profile and the scanner profile correcting LUT created in accordance with the procedure of FIGS. 11-13.

First, the chart image data D3 for creating the printer profile stored in the storage unit 120 is printed by a printer (herein the printing unit 260) that creates the printer profile (S501). Like the chart image data D1 (see FIG. 5A), the chart image data D3 is comprised of a plurality of patches which are composed of C, M, Y, K values and differentiated in color and density from each other.

Subsequently, a color measurement is performed with respect to each point (patch) (S502). The color measurement at the step S502 corresponds to the steps S101 through S105 of FIG. 7, and is such that the printed material created at the step S501 is read through use of the scanner unit 270, and the first color value as read is converted to the second color value using the scanner profile and the scanner profile correcting LUT, thereby making the correction.

The color measurement of step S502 is performed with respect to each point, and when the color measurement with respect to all the points is ended (S503: YES), the control unit 110 creates the printer profile (LUT) in accordance with a publicly known technique, in which the output CIE XYZ is described about the input points for which the CMYK values are taken in the form of a 4-dimensional lattice based on the color measurement data acquired. Alternatively, using the printer profile, a printer profile reverse to this printer profile, in which the CMYK values are made to be an output, is created for each of the input points for which XYZ is taken in the form of a 3-dimensional lattice (S504 (a printer profile creating unit)).

In this manner, it is possible to easily create an accurate printer profile, without using the special colorimeter 320, by performing a color measurement using the scanner profile and the scanner profile correcting LUT.

While the present invention has been described with respect to embodiments thereof, the present invention is by no means limited to the embodiments described above.

For example, in the embodiments, the creation of the scanner profile correcting LUT and the creation of the scanner profile were performed using different scanner units 270, but it is possible that the creations may be performed using the same scanner 270. In such a case, if the condition under which the scanner profile correcting LUT was created and the kind of paper are the same, it is possible that the scanner profile may be created from the color measurement data of the reference patches included in the color measurement data group acquired by reading the printed material of the chart image data D2. Then, the reading of the printed material of the chart image data D1 may be omitted (S401 and S402 of FIG. 13).

Further, although the scanner profile correcting LUT is that in which RGBK is made to be an input, the LUT may be made to be an LUT which is converted in accordance with the scanner profile and in which XYZ is made to be an input, instead of RGB, is made to be an input. For example, in the example illustrated in FIG. 6, the correction quantity determining unit 113 determines ΔXYZ based on XYZ converted at the color conversion unit 112 and the K value of the image data.

In addition, although in the example of FIG. 1, the controller 100 and the image forming apparatus 200 have been described as independent devices, it is possible that the function of the controller 100 may be incorporated into the image forming apparatus 200.

Further, description has been made of the embodiment in which, by way of example, the scanner unit 270 is provided in the conveyance path along which a sheet is conveyed that is formed with an image internally of the image forming apparatus 200. Instead, the scanner unit may be provided with a platen glass, which is widely used with common photocopiers, and configured to be able to read a script sheet that is placed on the platen glass or conveyed by an ADF. In such a case, a mapping between the read printed material and the chart image data and each patch of the printed material can be achieved in accordance with the user's designation or through recognition by the control unit of a characteristic image such as bar code or a register mark printed on the printed material.

Further, it is also possible that the printing unit may be separated to configure an image reading system, which is equipped with the functions of the scanner unit 270 and controller 100, so that the control flow described above may be executed by the image reading system.

Further, the program for causing the image reading system to operate (see FIGS. 4 and 7) may be provided by a computer readable recording medium such as floppy (Reg. Trademark) disk, CD-ROM or the like or may be provided online via a network such as internet or the like. In this case, the program recorded in a computer readable recording medium is normally transferred to and stored in a ROM, hard disk or the like. Further, for example, this program may be provided as an independent application software, or may be incorporated into the software of the apparatus as one of the functions of the image reading system.

What is claimed is:

1. A color conversion method in which a scanner that outputs a first color value of a device-dependent color space by reading a printed material is used to output a second color value of a device-independent color space, the method comprising the steps of:

acquiring a first color value by reading, by the scanner, a printed material which is based on image data composed of C, M, Y, K values;

converting the acquired first color value to a second color value using a scanner profile of the scanner that with the first color value being an input, describes the second color value with respect to the input;

mapping the first color value acquired from the printed material to the K value of the image data of the printed material;

determining a correction quantity of the second color value from the mapped first color value and the K value using a scanner profile correcting LUT that with the first color value and the K value being an input, describes the correction quantity of the second color value with respect to the input; and correcting the converted second color value using the determined correction quantity of the second color value, and outputting the second color value after being corrected.

2. The color conversion method according to claim 1, wherein the scanner profile is created based on a first color value acquired by reading, by the scanner, a first printed material formed from first chart image data comprised of a plurality of patches, which are differentiated in color and density from each other, and composed of the C, M, Y, K values, and a second color value acquired by performing a color measurement of the printed material by a colorimeter;

the scanner profile correcting LUT is created using a second printed material formed from second chart image data comprised of a plurality of reference patches, which are differentiated in color and density from each other, and a plurality of other patches, which are differentiated in K value from the reference patches, and composed of C, M, Y, K values; and the number of the patches included in the first chart image data is less than the number of the patches included in the second chart image data.

3. The color conversion method according to claim 2, wherein the second chart image data is comprised of the plurality of reference patches, and a plurality of other patches which are set up to be reproduced with a plurality of different K values and isochromatic to the reference patches.

4. The color conversion method according to claim 2, wherein all of the reference patch images of the reference patches included in the second printed material are included in the first printed material.

5. The color conversion method according to claim 1, wherein the scanner profile correcting LUT is created using a scanner other than the scanner and stored beforehand in a storage unit of the scanner.

6. The color conversion method according to claim 2, wherein the scanner profile correcting LUT is created by:

seeking other patch image formed with a K value different from a predetermined K value in which the first color value is the same with respect to the reference patch image formed in the second printed material with the predetermined K value; and calculating, as the correction quantity of the second color value, a differential value of the second color value of the patch image of the reference patch with respect to the second color value of the other patch image, wherein the scanner profile correcting LUT is created based on the first color value of the reference patch image, a differential value of the K value of the other patch image with respect to the K value of the reference patch image, and the calculated correction quantity.

7. The color conversion method according to claim 6, wherein in the absence of the other patch image in which the first color value is the same with respect to the reference patch image, the differential value of the second color value and the K value are calculated by interpolation calculation.

8. An image reading system comprising:
a scanner that reads a printed material of image data composed of C, M, Y, K values, thereby acquiring a first color value of a device-dependent color space;
a storage unit that stores a scanner profile describing a relationship between the first color value and a second color value of a device-independent color space and a scanner profile correcting LUT describing a correction quantity of the second color value with respect to the K value and the first color value; and
a hardware processor configured to:
convert the first color value acquired by reading the printed material by the scanner to the second color value, using the scanner profile;
cause the acquired first color value to be mapped to a K value of image data of the printed material and determine the correction quantity of the second color value from the mapped first color value and the K value using the scanner profile correcting LUT; and
correct the second color value converted by the hardware processor in accordance with the correction quantity of the second color value which is determined by the hardware processor and outputs the second color value after being corrected.

9. The image reading system according to claim 8, wherein the hardware processor is further configured to:
acquire the second color value acquired by performing a color measurement of a first printed material formed from first chart image data including a plurality of patches, which are composed of C, M, Y, K values and differentiated in color and density from each other, by a colorimeter that outputs the second color value of the device-independent color space; and
create the scanner profile based on the first color value acquired by reading the first printed material by the scanner and the second color value acquired by the hardware processor,
wherein the scanner profile correcting LUT is created using a second printed material formed from second chart image data composed of C, M, Y, K values and comprised of a plurality of reference patches, which are differentiated in color and density from each other, and a plurality of other patches for which the K value is made to be different with respect to the reference patches,
wherein the number of the patches included in the first chart image data is less than the number of the patches included in the second chart image data.

10. The image reading system according to claim 8, wherein the scanner profile correcting LUT is created using a scanner other than the scanner and stored beforehand in the storage unit.

11. The image reading system according to claim 8, wherein the scanner profile correcting LUT is created by:
seeking other patch image formed with a K value different from a predetermined K value in which the first color value is the same with respect to the reference patch image of the reference patch formed in the second printed material with the predetermined K value; and
calculating, as the correction quantity of the second color value, a differential value of the second color value of the patch image of the reference patch with respect to the second color value of the other patch image,
wherein the scanner profile correcting LUT is created based on the first color value of the reference patch image, a differential value of the K value of the other patch image with respect to the K value of the reference patch image, and the calculated correction quantity.

12. The image reading system according to claim 11, wherein in the absence of the other patch image in which the first color value is the same with respect to the reference patch image, the differential value of the second color value and the K value are calculated by interpolation calculation.

13. An image reading system comprising:
a scanner that reads a printed material of image data composed of C, M, Y, K values, thereby acquiring a first color value of a device-dependent color space;
a storage unit that stores a scanner profile describing a relationship between the first color value and a second color value of a device-independent color space and a scanner profile correcting LUT describing a correction quantity of the second color value with respect to the K value and the second color value;
a hardware processor configured to:
convert the first color value acquired by reading the printed material by the scanner to the second color value, using the scanner profile;
cause the second color value converted by the color conversion unit to be mapped to the K value of image data of the printed material and determine the correction quantity of the second color value from the mapped first color value and the K value using the scanner profile correcting LUT; and
correct the second color value converted by the hardware processor in accordance with the correction quantity of the second color value which is determined by the hardware processor and outputs the second color value after being corrected.

14. The image reading system according to claim 13, wherein the hardware processor is further configured to:
acquire the second color value acquired by performing a color measurement of a first printed material formed from first chart image data including a plurality of patches, which are composed of C, M, Y, K values and differentiated in color and density from each other, by a colorimeter that outputs the second color value of the device-independent color space; and
create the scanner profile based on the first color value acquired by reading the first printed material by the scanner and the second color value acquired by the color value acquiring unit,
wherein the scanner profile correcting LUT is created using a second printed material formed from second chart image data composed of C, M, Y, K values and comprised of a plurality of reference patches, which are differentiated in color and density from each other, and a plurality of other patches for which the K value is made to be different with respect to the reference patches,
wherein the number of the patches included in the first chart image data is less than the number of the patches included in the second chart image data.

15. An image forming apparatus comprising:
the image reading system set forth in claim 8;
a printing unit that performs printing based on chart image data including a plurality of patches which are composed of C, M, Y, K values and differentiated in color and density from each other to output the printed material; and
the hardware processor is further configured to create a printer profile of the printing unit, describing a relationship between the second color value and C, M, Y, K values, from a second color value outputted from the color output unit by reading the printed material of the chart image data by the image reading system and the C, M, Y, K values of the chart image data.

16. An image forming apparatus comprising:

the image reading system set forth in claim 13;

a printing unit that performs printing based on chart image data including a plurality of patches which are composed of C, M, Y, K values and differentiated in color and density from each other to output the printed material; and the hardware processor is further configured to create a printer profile of the printing unit, describing a relationship between the second color value and C, M, Y, K values, from a second color value outputted from the color output unit by reading the printed material of the chart image data by the image reading system and the C, M, Y, K values of the chart image data.

* * * * *